US011412502B2

(12) United States Patent
Monajemi et al.

(10) Patent No.: US 11,412,502 B2
(45) Date of Patent: Aug. 9, 2022

(54) COOPERATIVE SOUNDING BASED ON COHERENT SUBCARRIER ASSIGNMENTS

(71) Applicant: Cisco Technology, Inc., San Jose, CA (US)

(72) Inventors: Pooya Monajemi, Irvine, CA (US); Matthew A. Silverman, Shaker Heights, OH (US); Gautam D. Bhanage, Milpitas, CA (US); Paul J. Stager, Akron, OH (US); Fred J. Anderson, Lakeville, OH (US)

(73) Assignee: Cisco Technology, Inc., San Jose, CA (US)

( * ) Notice: Subject to any disclaimer, the term of this patent is extended or adjusted under 35 U.S.C. 154(b) by 218 days.

(21) Appl. No.: 16/810,671

(22) Filed: Mar. 5, 2020

(65) Prior Publication Data
US 2021/0282132 A1     Sep. 9, 2021

(51) Int. Cl.
*H04W 72/04* (2009.01)

(52) U.S. Cl.
CPC ... *H04W 72/0426* (2013.01); *H04W 72/0413* (2013.01); *H04W 72/0446* (2013.01); *H04W 72/0453* (2013.01)

(58) Field of Classification Search
CPC ......... H04W 72/0426; H04W 72/0413; H04W 72/0446; H04W 72/0453; H04L 5/0007; H04L 5/0091; H04L 5/0035
See application file for complete search history.

(56) References Cited

U.S. PATENT DOCUMENTS

| 9,350,434 | B2 | 5/2016 | Sohn et al. |
| 9,820,326 | B2 | 11/2017 | Gubeskys et al. |
| 9,823,300 | B2 | 11/2017 | Pagani |
| 9,839,047 | B2 | 12/2017 | Kwon et al. |
| 9,864,042 | B2 | 1/2018 | Pandey |
| 10,218,416 | B2 * | 2/2019 | Silverman ........... H04L 41/0893 |
| 10,772,099 | B2 * | 9/2020 | Verma ................. H04L 5/0094 |
| 11,088,734 | B2 * | 8/2021 | Guerra ............... H04L 25/0202 |
| 2016/0345343 | A1 * | 11/2016 | Elsherif ............. H04W 72/121 |
| 2017/0331605 | A1 | 11/2017 | Shani et al. |

(Continued)

FOREIGN PATENT DOCUMENTS

| CN | 105209927 A | 12/2015 |
| EP | 2992353 A2 | 3/2016 |

OTHER PUBLICATIONS

Suh et al., "Sounding for AP Collaboration," IEEE 802.11-19/1535r0, Sep. 2019, 11 pages.

(Continued)

*Primary Examiner* — Brian T O Connor
(74) *Attorney, Agent, or Firm* — Patterson + Sheridan, LLP

(57) ABSTRACT

Techniques for efficient network probing are provided. Coherence data is received from a plurality of access points (APs), where the coherence data indicates, for each respective AP of the plurality of APs, coherence bandwidth for a plurality of subcarriers. A mapping is generated indicating, for each of the plurality of APs, sets of subcarriers that can be interchangeably sounded. Two or more APs of the plurality of APs that can jointly sound a first subcarrier of the plurality of subcarriers are then identified based on the mapping, and the first subcarrier is allocated to the identified two or more APs for future sounding.

20 Claims, 7 Drawing Sheets

(56) References Cited

U.S. PATENT DOCUMENTS

| | | | | |
|---|---|---|---|---|
| 2018/0027580 A1* | 1/2018 | Yoo | .................. | H04W 28/0236 |
| | | | | 370/230 |
| 2019/0132762 A1 | 5/2019 | Zhu et al. | | |
| 2019/0261369 A1* | 8/2019 | Verma | .................. | H04B 7/0619 |
| 2020/0212977 A1* | 7/2020 | Bengtsson | ........... | H04B 7/0695 |

OTHER PUBLICATIONS

Park et al., "Multi-AP Transmission Procedure," IEEE 802.11-19/0804r0, May 2019, 14 pages.

* cited by examiner

COOPERATIVE SOUNDING BASED ON COHERENT SUBCARRIER ASSIGNMENTS

TECHNICAL FIELD

Embodiments presented in this disclosure generally relate to wireless coherence. More specifically, embodiments disclosed herein relate to determining subcarrier coherence to efficiently perform cooperative sounding.

BACKGROUND

A large variety of network deployments provide one or more access points (APs) in a physical space, and allow client devices to wirelessly communicate with the AP(s) to utilize the network. This can include enabling communication among the various client devices on the network, as well as providing connectivity to larger networks, such as the Internet. In many systems, each client device communicates with a single AP at any given time. At times, as the client device moves (or as the wireless characteristics change), the client device could be better served by a different AP (e.g., with stronger perceived signal strength). In such an instance, the deployment typically provides capability to hand off the client device between APs as needed.

Recently the IEEE 802.11be standard was defined, introducing the concept of cooperative APs. In such a deployment, multiple APs can communicate with the same client(s) at the same time. In some instances, they do so via Physical Layer Convergence Protocol (PLCP). This cooperative transmission can enable the participating APs to jointly transmit the same PLCP Protocol Data Units (PPDUs) to one or more client devices. The cooperative concept can also allow the APs to transmit data to their own clients, while nulling to the clients of other APs. Further, such cooperative transmission can allow the APs to transmit to certain Resource Units (RUs) in a shared PPDU transmission. However, cooperative transmission introduces significant complexity, and requires knowledge of channel information for the client devices and APs.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
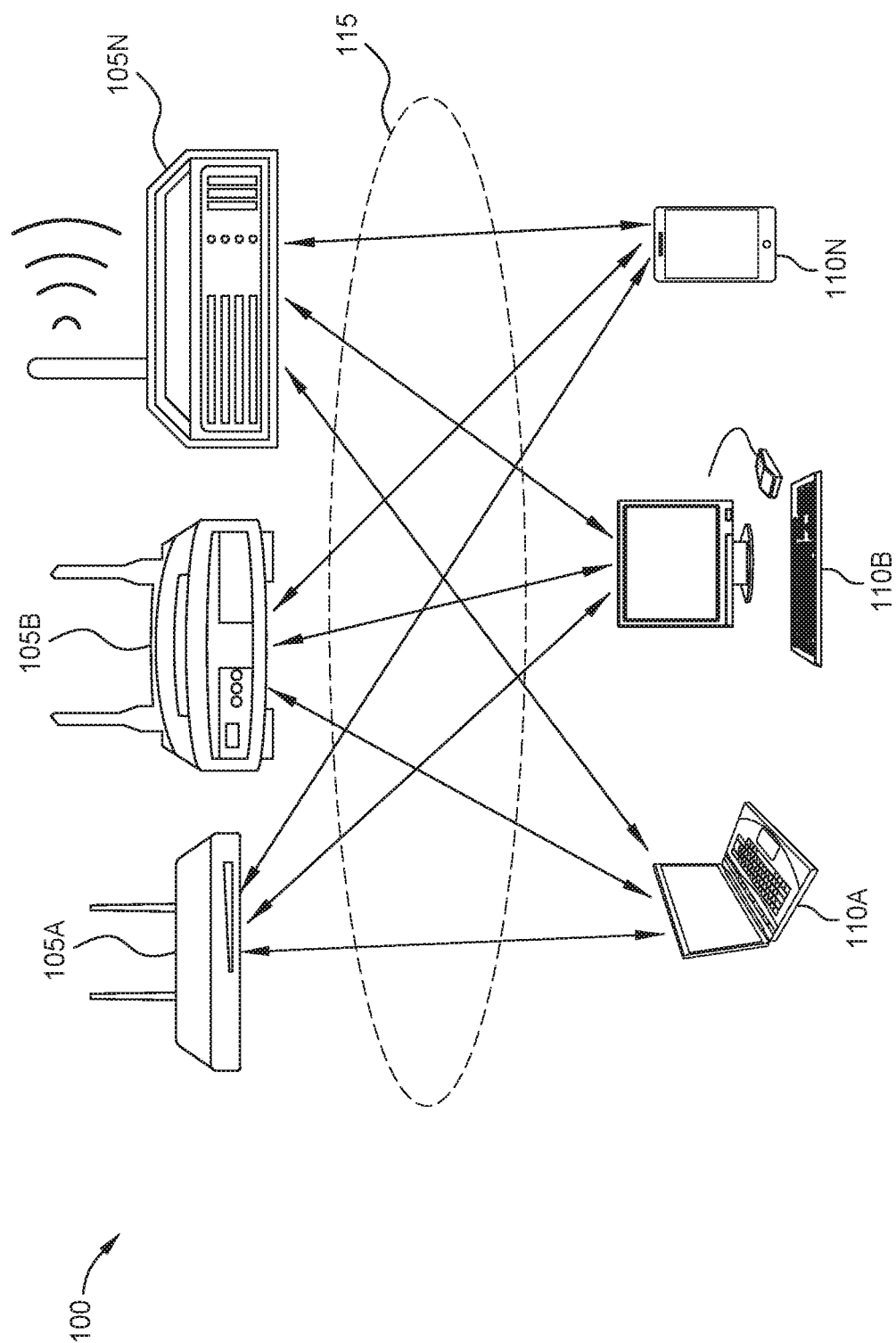
FIG. 1 depicts a system configured to provide efficient AP sounding based on subcarrier coherence, according to one embodiment disclosed herein.

According to one embodiment presented in this disclosure, a method is provided. The method includes receiving coherence data from a plurality of access points (APs), wherein the coherence data indicates, for each respective AP of the plurality of APs, coherence bandwidth for a plurality of subcarriers, and generating a mapping indicating, for each of the plurality of APs, sets of subcarriers that can be interchangeably sounded. The method further includes identifying, based on the mapping, two or more APs of the plurality of APs that can jointly sound a first subcarrier of the plurality of subcarriers. Additionally, the method includes allocating the first subcarrier to the identified two or more APs for future sounding.

Another embodiment presented in this disclosure is a non-transitory computer-readable storage medium. The computer-readable storage medium contains computer program code that, when executed by operation of one or more computer processors, performs an operation. The operation includes receiving coherence data from a plurality of access points (APs), wherein the coherence data indicates, for each respective AP of the plurality of APs, coherence bandwidth for a plurality of subcarriers, and generating a mapping indicating, for each of the plurality of APs, sets of subcarriers that can be interchangeably sounded. The operation further includes identifying, based on the mapping, two or more APs of the plurality of APs that can jointly sound a first subcarrier of the plurality of subcarriers. Additionally, the operation includes allocating the first subcarrier to the identified two or more APs for future sounding.

Another embodiment presented in this disclosure is a system. The system includes one or more computer processors, and a memory. The memory contains a program which, when executed by the one or more computer processors, performs an operation. The operation includes receiving coherence data from a plurality of access points (APs), wherein the coherence data indicates, for each respective AP of the plurality of APs, coherence bandwidth for a plurality of subcarriers, and generating a mapping indicating, for each of the plurality of APs, sets of subcarriers that can be interchangeably sounded. The operation further includes identifying, based on the mapping, two or more APs of the plurality of APs that can jointly sound a first subcarrier of the plurality of subcarriers. Additionally, the operation includes allocating the first subcarrier to the identified two or more APs for future sounding.

Example Embodiments

Embodiments of the present disclosure provide techniques to efficiently perform collaborative sounding based on subcarrier coherence bandwidths. For collaborative transmission to operate effectively, it is vital to determine channel information for the client devices and APs (including APS a given client is not currently associated/communicating with). Collecting such information, however, can rapidly become inefficient, requiring significant overhead. Embodiments of the present disclosure provide methods to sound more quickly and efficiently. In one embodiment, multiple APs are sounded by splitting up subcarriers among the APs. To ensure realistic and useful divisions, embodiments of the present disclosure provide techniques to identify good matches between APs that can reliably sound together without degrading performance (e.g., due to unsounded subcarriers that have poor coherence/correlation to adjacent/sounded subcarriers).

Existing solutions typically require sounding exchanges to occur between each AP/client combination, for each subcarrier. That is, each AP must sound for each connected client device, on every subcarrier. Further, if the AP and/or client have multiple antennas, existing systems must typically sound on a per-antenna basis. The amount of time and bandwidth dedicated to sounding can therefore rapidly exceed reasonable limits, and burden the network. Additionally, if the number of APs that the client is able to sound is less than the number of APs involved in the joint transmission or other collaborative transmission, problems can easily arise, as the collaborative transmission may utilize combinations and/or subcarriers that have not been sounded/evaluated. Some recent efforts have included, for a set of N APs, simply instructing each AP to sound every Nth subcarrier. However, this assumes that the system has relatively high coherence bandwidth, which fails to account for many realistic deployments. In deployments with narrow coherence bandwidth in some regions, such approaches fail to adequately sound the network.

Embodiments of the present disclosure provide techniques to dynamically group APs based on subcarrier coherence bandwidth, in order to effectively and efficiently sound the network in a way that ensures adequate information is available to drive joint transmissions while minimizing the overhead introduced by the sounding. To do so, in one embodiment, each AP involved in the collaborative communication (also referred to as a virtual service set (SS) or basic service set (BSS), joint transmission, and the like) reports, to a master AP or other centralized controller, its own local estimate of its coherence bandwidth (BW) for the channel.

The master AP or other controller can track the estimates for coherence BW among the APs, and determine if joint sounding can be accomplished (e.g., based on determining whether the coherence BW is sufficiently large). If so, in one embodiment, the master AP designates/allocates subcarriers to be used by each AP during the sounding, attempting to interleave APs into every other sounded subcarrier in order to take advantage of the coherence BW of the channel. The APs can then report any detected lack of coherence over adjacent sounded subcarriers for that AP/client pair, and several steps can be taken to mitigate potential concerns.

In one embodiment, this mitigation can include ensuring that the scheduled joint transmission, joint beamforming (BF), and/or joint Orthogonal Frequency Division Multiple Access (OFDMA) does not assign that AP to the reported RU in question. Additionally, in subsequent soundings, the designated subcarriers can be assigned to provide more granularity in subcarriers where it is needed for each AP/client combination (e.g., in areas where the AP detected a lack of coherence with adjacent subcarriers). Further, in at least one embodiment, the system can schedule one or more follow-up sounding events to fill in the gaps before any joint transmission is attempted.

FIG. 1 depicts a system 100 configured to provide efficient AP sounding based on subcarrier coherence, according to one embodiment disclosed herein. In the illustrated embodiment, a number of APs 105A-N provide communications via a Network 115 for a set of Client Devices 110A-N (also referred to as stations). As illustrated, each AP 105 can be communicatively coupled with any number of Client Devices 110. Additionally, in embodiments, each Client Device 110 can be communicatively coupled with any number of APs 105. That is, in the illustrated embodiment, the system 100 is configured to provide collaborative or joint transmissions, whereby two or more APs 105A-N can jointly exchange data with a given Client Device 110. In some embodiments, some of the Client Devices 110 instead communicate with a single AP 105 at a time.

In the illustrated embodiment, to provide joint transmission, the system 100 determines coherence bandwidths and generates subcarrier sounding assignments to ensure adequate coverage with reduced overhead. This process can begin with coherence characterization, where each of the APs 105 determines coherence information. In one embodiment, each AP 105 uses explicit sounding to determine its subcarrier coherence with respect to each Client 110. In another embodiment, each AP 105 begins tracking implicit sounding as packets from the Client(s) 110 are received in the ordinary course, in order to characterize the channel coherence and coherence time. In a related embodiment, if an insufficient number of uplink packets are received for a given Client 110, the AP 105 can trigger an individual full BW sounding for the Client 110. In another embodiment, upload traffic can be solicited from the Client 110 (e.g., with Block Acknowledgement Requests (BARs) or trigger frames), and this uplink traffic can then be used for implicit sounding.

In one embodiment, each AP 105 calculates how correlated each subcarrier's channel estimate is to every other subcarrier in the channel (or out to some predefined distance of $K_{max}$ subcarriers), with respect to each connected Client 110. Each respective subcarrier can then be assigned a number, L[k], based on how far the respective subcarrier is from the last coherent subcarrier. As used herein, subcarriers are classified as coherent if its channel estimate is correlated above a configurable threshold $C_{min}$. For example, in such an embodiment, if the ith subcarrier is sufficiently coherent with the three subcarriers on either side of the first subcarrier, L[i]=3. In an embodiment, there is a channel estimate H[k] for each subcarrier k, where the estimate is a matrix of size N×M, where N is the number of transmit (Tx) chains of the AP and M is the number of receive (Rx) chains of the client device. In one such embodiment, to see if two subcarriers k1 and k2 are correlated, the system utilizes Equation 1 below, and checks whether the result is above the predefined threshold.

$$\text{Corr}(k1,k2)=\text{sum}(\text{sum}(\text{abs}(H[k1]H\times H[k2]))) \qquad \text{Equation 1}$$

In some embodiments, once each AP 105 has determined this information for each subcarrier/Client 110, it can prepare and transmit a message specifying the determined L[k] value(s) to the master AP (or other central entity that is controlling joint transmission resourcing). In one embodiment, this message can be compressed to include only the boundaries of the coherent subcarriers, rather than the value for every subcarrier. For example, the message may indicate {segment[0]=L[0] thru L[15], segment[1]=L[16] thru L[20], . . . } indicating that subcarriers zero through fifteen are coherent with each other, as are subcarriers sixteen through twenty.

In at least one embodiment, these estimates can be repeated a predefined number of times (or for a predefined period of time) in order to build up more robust statistics on coherence BW for each AP/client pair. The master AP or central resourcing entity can then evaluate the L[k] information for the set of APs that are involved in or configured to provide joint transmission, and determine which subcarriers are highly coherent to other subcarriers (e.g., above the defined threshold), as well as which vary over time or have a narrow coherence BW a given AP/client pair (e.g., below the threshold).

In an embodiment, a mapping M[k,i,j] can then be created for each AP/client pair, where the mapping indicates subcarriers that can be used to sound any other subcarrier. In M[k,i,j], k is the index of the subcarrier for the ith AP 105 and jth Client Device 110, and the mapping returns the set of subcarriers that can be interchangeably sounded for the kth subcarrier. In an embodiment, once this mapping is generated, the master AP or other controller can group the APs and initiate group sounding. In one embodiment, the controller does so by, using the mapping M[k,i,j] to determine if there is a joint pairing of APs 105 for sounding that can satisfy sounding all subcarriers for the group of APs 105. That is, the system groups the APs 105 based on the coherence data, such that each grouping of APs sounds one or more specified subcarriers, and utilizes the resulting data as representative of the entire channel (e.g., because the system has determined that, for each unsounded subcarrier in the channel, the sounding information from one or more of the sounded subcarriers can be utilized, because the subcarriers are highly coherent).

The master can then communicate these groupings and subcarrier allocations to the APs 110. In one embodiment, such a grouping is valid for a relatively brief period of time (e.g., on the order of hundreds of milliseconds) to ensure the system 100 can react to changing scenarios. That is, the system 100 can repeat this evaluation frequently (e.g., every hundred milliseconds). In an embodiment, scheduled sounding events can then be performed using the above grouping. This reduces the overall sounding required (e.g., because each group of APs 105 sounds only specified subcarriers) while ensuring adequate results (because the controller relies on coherence data when assigning groups/subcarriers).

In an alternative embodiment, each AP 105 can instead attempt to do ordinary full sounding, and a central entity can monitor performance data from each AP 105 and/or Client Device 110 in order to determine if there is degradation due to poor sounding. If so, the central entity can request a sounding report from a given AP 105 to confirm the suspicion of poor performance. If the sounding report confirms the suspicion, the controller can avoid scheduling sounding between the incompatible APs 105, and instead implement separate sounding for the future.

In an embodiment, the statistics on channel coherence are continuously updated for each AP 105 with implicit and/or explicit sounding, and intermittent L[k] messages are sent to the master AP or other controller. The controller than uses these message to update the AP groupings and/or subcarrier allocations frequently (e.g., on the order of hundreds to thousands of milliseconds). In one embodiment, the latency between coherence updates depends at least in part on the overall coherence time of the channel (not to be confused with the coherence BW). If the channel is relatively static (e.g., where the coherence changes are below a threshold amount for at least a minimum amount of time), updating need not be as frequent with respect to the AP/client pair. For AP/client pairings with shorter coherence times, updates can be more frequent.

In another embodiment, if coherence time for a given AP/client pair is below a predefined threshold, the system can enter a second mode where the AP/client combination with problematic/short coherence time is excluded from this continuous updating, because the updating requirement imposes excessive burden (e.g., very frequent or repetitive soundings). Instead, the system can monitor that identified combination AP/client and channel infrequently over time in order to determine if it should be reconsidered for inclusion in this sounding at all. In one embodiment, the AP can still be paired with other APs, but with a limited number of them.

In still another embodiment, the APs 105 can simply use interleaved sounding (e.g., where each AP 105 sounds every Nth subcarrier). If the master entity detects a problem because of poor downlink performance in a joint transmission, it can poll the relevant APs 105 for a sounding report. That is, the master controller can utilize a push method to retrieve the coherence information. The master entity can then determine whether there is indeed a problem, and avoid doing joint sounding with the incompatible APs 105. Embodiments of the present disclosure therefore provide various techniques to find the best matching APs 105 in a joint sounding, as there will be some APs 105 that need more resolution in certain subcarriers.

In some embodiments, the coherence data can be provided by sending an initial estimate of the coherent and incoherent subcarriers, followed by intermittent compressed updates. Some AP/client combos will tend to need updates quite frequently, while others need to send them less frequently. These updates can be transmitted in batches based on the coherence time. For example, with a short coherence time, updates may be transmitted every hundred milliseconds. For a medium coherence time, updates can be provided every five hundred milliseconds. Similarly, for long coherence times, updates can be transmitted every thousand milliseconds.

Figure 2:
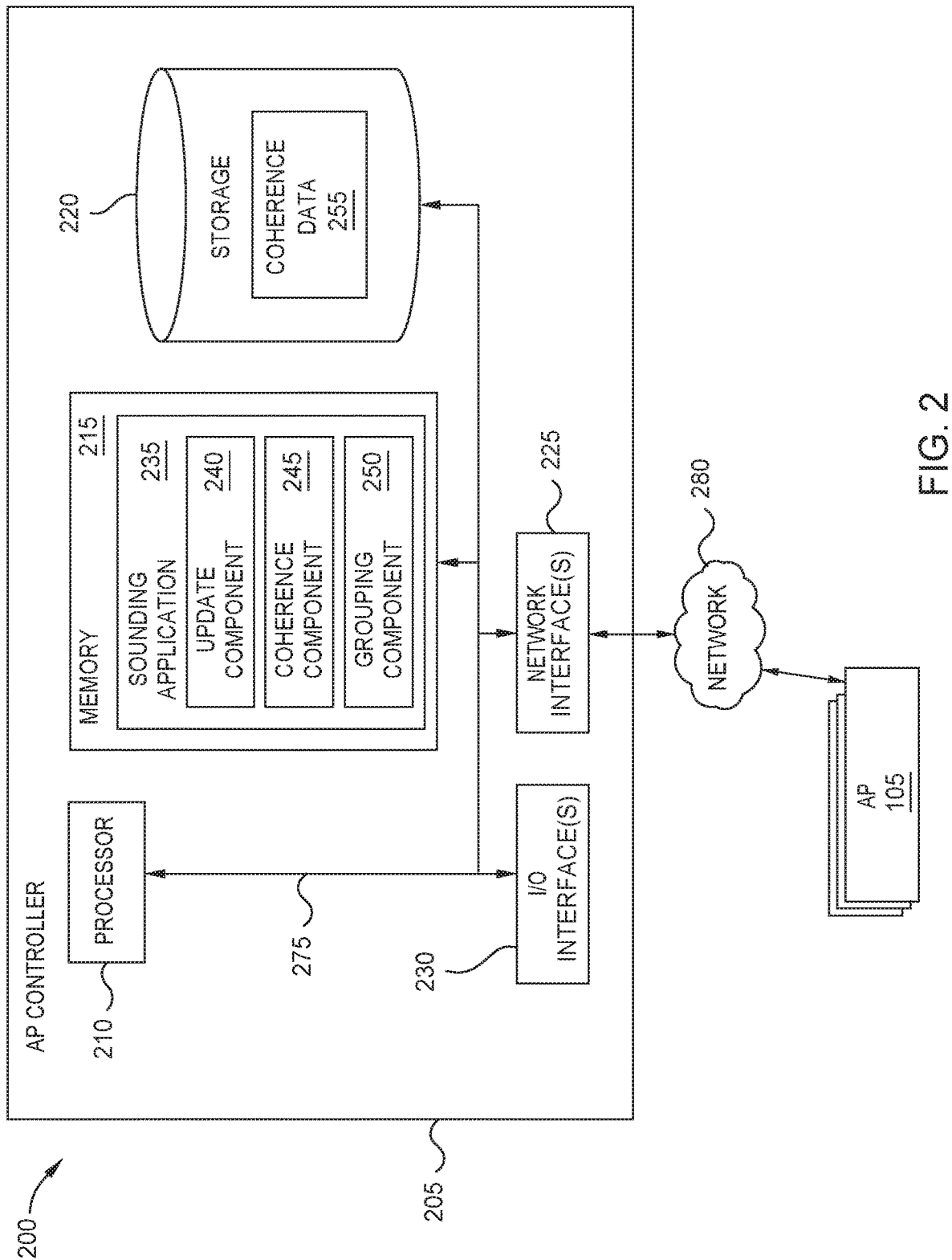
FIG. 2 is a block diagram illustrating an AP controller configured to improve AP sounding based on subcarrier coherence, according to one embodiment disclosed herein.

FIG. 2 is a block diagram illustrating an AP Controller 205 configured to improve AP sounding based on subcarrier coherence, according to one embodiment disclosed herein. In embodiments, the AP Controller 205 may be a master AP 105, or any other centralized controller that drives the sounding and joint transmission decisions. Although depicted as a physical device, in embodiments, the AP Controller 205 may implemented as a virtual device or service, and/or across a number of devices (e.g., in a cloud environment). As illustrated, the AP Controller 205 includes a Processor 210, Memory 215, Storage 220, a Network Interface 225, and one or more I/O Interfaces 230. In the illustrated embodiment, the Processor 210 retrieves and executes programming instructions stored in Memory 215, as well as stores and retrieves application data residing in Storage 220. The Processor 210 is generally representative of a single CPU and/or GPU, multiple CPUs and/or GPUs, a single CPU and/or GPU having multiple processing cores, and the like. The Memory 215 is generally included to be representative of a random access memory. Storage 220 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 230. Further, via the Network Interface 225, the AP Controller 205 can be communicatively coupled with one or more other devices and components (e.g., via the Network 280, which may include the Internet, local network(s), and the like). Additionally, the Network 280 may include wired connections, wireless connections, or a combination of wired and wireless connections. In the illustrated embodiment, the AP Controller 205 is communicatively coupled with a set of APs 105. Further, as illustrated, the Processor 210, Memory 215, Storage 220, Network Interface(s) 225, and I/O Interface(s) 230 are communicatively coupled by one or more Buses 275.

In the illustrated embodiment, the Storage 220 includes stored Coherence Data 255. Although depicted as residing in Storage 220, in embodiments, the Coherence Data 255 may be located in any suitable location. The Coherence Data 255 includes previously-collected information relating to channel and subcarrier coherence for the APs 105. In one embodiment, the Coherence Data 255 indicates, for each AP 105 and Client Device 110 combination, the coherence of one or more subcarriers. That is, the Coherence Data 255 can include a set of records, each indicating (i) the corresponding AP 105, (ii) the Client Device 110 with which the AP 105 was communicating when collecting the coherence data, and (iii) the coherence of one or more subcarriers during the communication.

In one embodiment, the Coherence Data 255 indicates, for each respective subcarrier, the distance between the respective subcarrier and the last coherent subcarrier. Stated differently, the Coherence Data 255 can indicate the number of subcarriers above and/or below the respective subcarrier that are coherent with the respective subcarrier (e.g., with sufficiently similar characteristics). In another embodiment, the Coherence Data 255 indicates segments of coherent subcarrier bandwidth, as discussed above. For example, the Coherence Data 255 can indicate that a first coherent segment includes subcarrier indices zero through five, the next coherent segment includes subcarriers six and seven, the next includes subcarriers eight through seventeen, and so on. Based on this Coherence Data 255, the AP Controller 205 can identify subcarriers and/or APs 105 that can be sounded interchangeably (such that sounding one will provide sufficient data for the others), as well as areas of narrow coherence bandwidth where additional and/or more granular sounding is needed.

In some embodiments, the Coherence Data 255 additionally includes information relating to the coherence time for each subcarrier, AP 105, and/or Client Device 110. For example, the Coherence Data 255 can include timestamped coherence information collected over a period of time. In an embodiment, the AP Controller 205 can use this time-stamped data to determine a coherence time for each subcarrier/AP/client. For example, the Coherence Data 255 can be generated or updated to reflect how long each subcarrier remains coherent with the other subcarriers in the channel. This coherence time can inform the update interval (e.g., updating the information more frequently for subcarriers with low coherence time, and less frequently for subcarriers with higher coherence time).

In the illustrated embodiment, the Memory 215 includes a Sounding Application 235. Although depicted as software residing in Memory 215, in embodiments, the functionality of the Sounding Application 235 can be implemented using software, hardware, or a combination of software and hardware. As illustrated, the Sounding Application 235 includes an Update Component 240, a Coherence Component 245, and a Grouping Component 250. Although depicted as discrete components for conceptual clarity, in embodiments, the operations of the Update Component 240, Coherence Component 245, and Grouping Component 250 can be combined or distributed across any number of components and devices.

In embodiments, the Update Component 240 communicates with the APs 105 to receive coherence information. In one embodiment, this includes periodically requesting an update from each AP 105. In another embodiment, the Update Component 240 transmits an indication of the relevant period or interval to each AP 105, and waits for the periodic transmissions. In at least one embodiment, the relevant interval varies for each AP 105 and/or subcarrier/client, based on the prior Coherence Data 255. For example, for each client, AP, and/or each subcarrier combination, the Update Component 240 can determine an appropriate update interval based on the corresponding coherence time. Subcarriers that remain coherent for relatively longer periods of time (e.g., seconds) can have longer intervals, while more dynamic subcarriers with shorter coherence times (e.g., on the order of a hundred milliseconds) can have significantly shorter update intervals. In an embodiment, the Update Component 240 indicates the relevant interval(s) to each AP 105, such that the APs 105 can return coherence information appropriately. In another embodiment, the Update Component 240 refers to the intervals to periodically request the relevant data from each AP 105.

In an embodiment, the Coherence Component 245 utilizes the newly-received coherence information from the APs 105 to update the Coherence Data 255. In one embodiment, this includes updating the mapping to indicate which subcarriers are coherent for each AP/client. In some embodiments, the Coherence Component 245 similarly updates the coherence times for each. For example, based on the time elapsed between updates and the variance in coherence between the updates, the Coherence Component 245 can determine a coherence time for each subcarrier/AP/client combination. The coherence time generally indicates how stable the subcarrier coherence is, and therefore how frequently the Sounding Application 235 should recalculate the mappings and reassign AP groups/subcarriers.

The Grouping Component 250 utilizes this mapping and/or the Coherence Data 255 to group the APs 105 and allocate subcarriers for sounding. In one embodiment, performing this grouping and allocation includes identifying a set of APs 105 with similarly broad coherence for one or more subcarriers, such that they can sound the subcarriers together (e.g., in preparation of joint transmission), and such that sounding any of the subcarriers is likely to be satisfactory for them all. These APs 105 can be grouped together, and assigned one or more of the identified subcarriers to be sounded. In some embodiments, the Grouping Component 250 ensures that APs 105 are placed in separate groups if they have narrow coherence bandwidth around the same group of subcarriers, because they cannot be easily combined into a joint transmission. In one embodiment, the subcarriers cannot be grouped because both client devices require a higher rate of sampling across subcarriers in that same group of subcarriers. That is, the system cannot (or should not) group the clients together because it would result in under sampling at least one of the clients in that critical group of subcarriers.

For each generated group of APs 105, the Grouping Component 250 assigns one or more subcarriers to be sounded. The Grouping Component 250 then transmits the groupings and subcarrier allocations to the APs 105. The APs 105 can then proceed to jointly sound their allocated subcarriers, within the defined groupings. In an embodiment, the APs 105 subsequently return sounding data based on the completed soundings.

Figure 3:
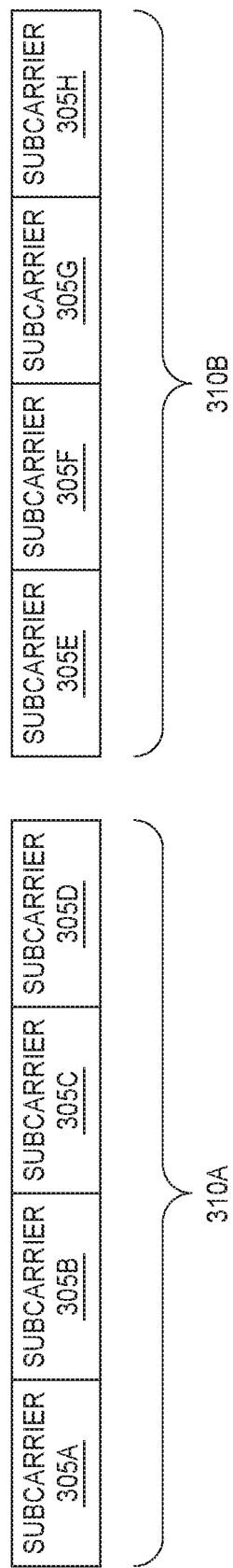
FIG. 3 depicts a number of subcarriers and methodology to classify subcarrier coherence, according to one embodiment disclosed herein.

FIG. 3 depicts a number of subcarriers and methodology to classify subcarrier coherence, according to one embodiment disclosed herein. Eight Subcarriers 305A-H are depicted in the illustrated embodiment, but there may of course be any number of Subcarriers 305. As illustrated, the channel generally consists of a number of discrete Subcarriers 305 closely spaced in the spectrum. As used herein, Subcarriers 305 are considered to be "adjacent" if they are next to each other in the spectrum. For example, Subcarrier 305D is adjacent to Subcarrier 305C and Subcarrier 305E.

In some embodiments, the entire channel is sounded by individually probing each Subcarrier 305A-H for each AP/client combination. In another embodiment, implicit sounding is utilized to probe the Subcarriers 305A-H. In some embodiments of the present disclosure, Coherence Bandwidths 310A and 310B are identified, and this coherence information is used to allocate AP groupings and subcarrier assignments. In the illustrated embodiment, Subcarriers 305A-D form a first Coherence Bandwidth 310A, indicating that they can be sounded together and/or interchangeably. That is, the sounding information for Subcarrier 305B can be used as representative for Subcarrier 305C, 305D, and 305A. Similarly, Subcarriers 305E-H are included in Coherence Bandwidth 310B.

Thus, in the illustrated embodiment, the AP(s) can be assigned to sound any of Subcarriers 305A-D and any of Subcarriers 305E-H, in order to generate sufficient sounding data. Note that, in embodiments, the Coherence Bandwidths 310 may differ for different APs 105, and/or different Client Devices 110. That is, the illustrated Coherence Bandwidths 310A-B are applicable for communications between a first AP 105 and a first Client Device 110. For communications between the first AP 105 and a second Client Device 110, the Coherence Bandwidths 310 (and therefore the Subcarriers 305 that should be sounded) may differ. Similarly, for communications between a second AP 105 and the first Client Device 110, the Coherence Bandwidths 310 can also differ.

Figure 4:
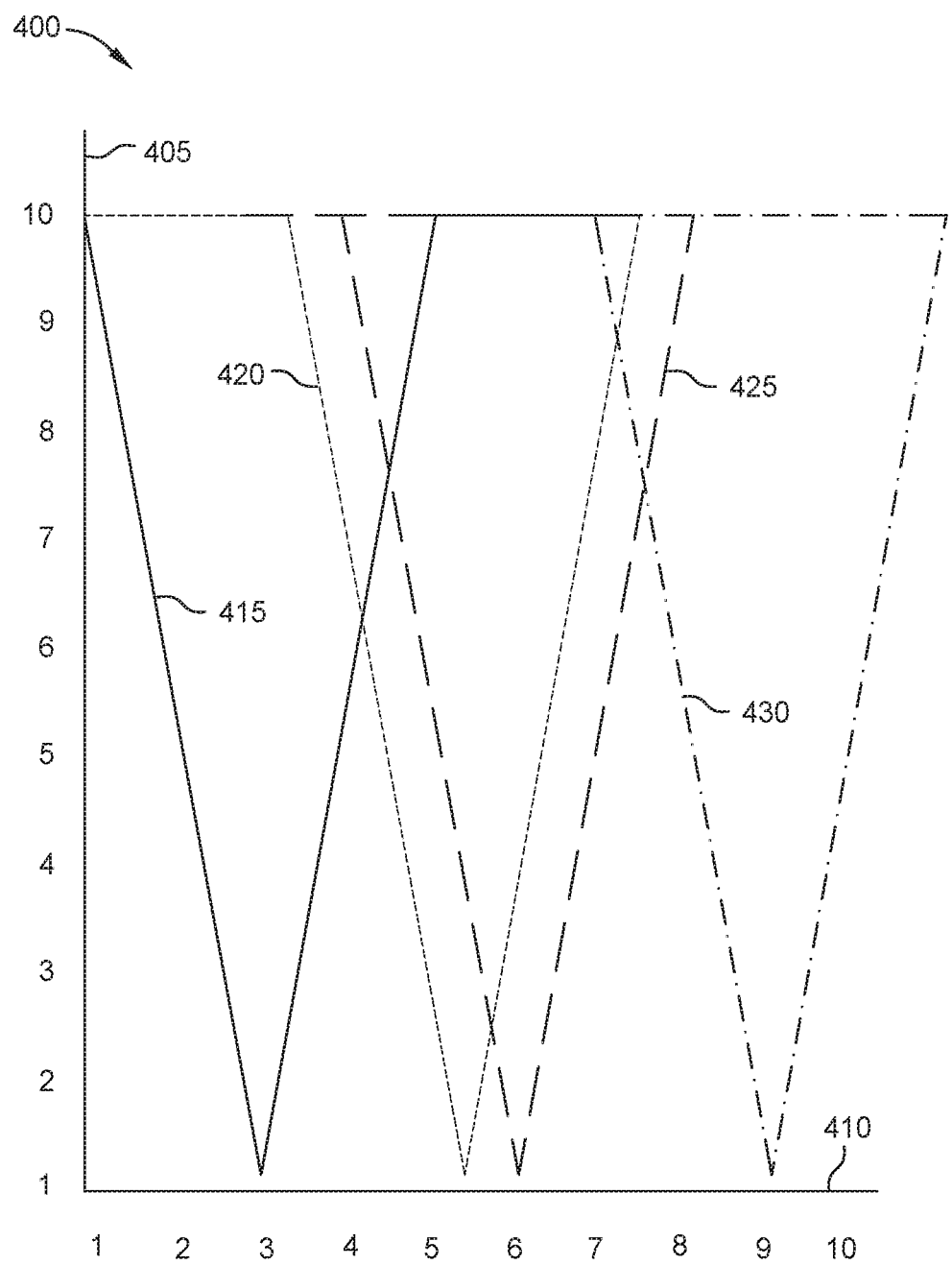
FIG. 4 depicts subcarrier coherence bandwidth across a number of APs, according to one embodiment disclosed herein.

FIG. 4 depicts subcarrier coherence bandwidth across a number of APs, according to one embodiment disclosed herein. In the illustrated embodiment, a number of Lines 415, 420, 425, and 430 are plotted on a Graph 400 to depict coherence bandwidth across subcarriers, according to one embodiment. Specifically, the values on the horizontal axis (labeled 410) indicate the index of the subcarrier, and the vertical axis (labeled 405) denotes the coherence bandwidth of the subcarrier. Each Line 415, 420, 425, and 430 corresponds to data collected from a respective AP 105.

As illustrated, a first AP 105 reflected by Line 415 has a low coherence bandwidth around subcarrier index 3, but a high subcarrier coherence bandwidth for subcarrier indices 5-10. In the case where the channels/subcarriers for a particular AP/client pair are coherent enough to simply sound every N subcarriers, the grouping can be relatively simple. In such a case, for grouping N APs, the Sounding Application 235 can assign every Nth subcarrier to each AP.

In the illustrated embodiment, however, each AP 105 has narrow coherence bandwidth for some regions of the channel. For such a deployment, where many APs have regions of subcarriers that have narrow coherence BW, a more complex analysis and grouping scheme is utilized. In the illustrated plot, the Lines 420 and 425 both indicate a narrow coherence bandwidth around the same group of subcarriers, indicating that the corresponding APs 105 cannot easily be combined into a group. Thus, in one embodiment, the Sounding Application 235 will instead group the AP 105 reflected by Line 415 with the AP(s) 105 reflected by Line(s) 415 and/or 430. In some embodiments, each AP 105 can be more heavily sampled in its narrow regions, and evenly distributed or sampled in the regions where coherence bandwidth is higher.

Figure 5:
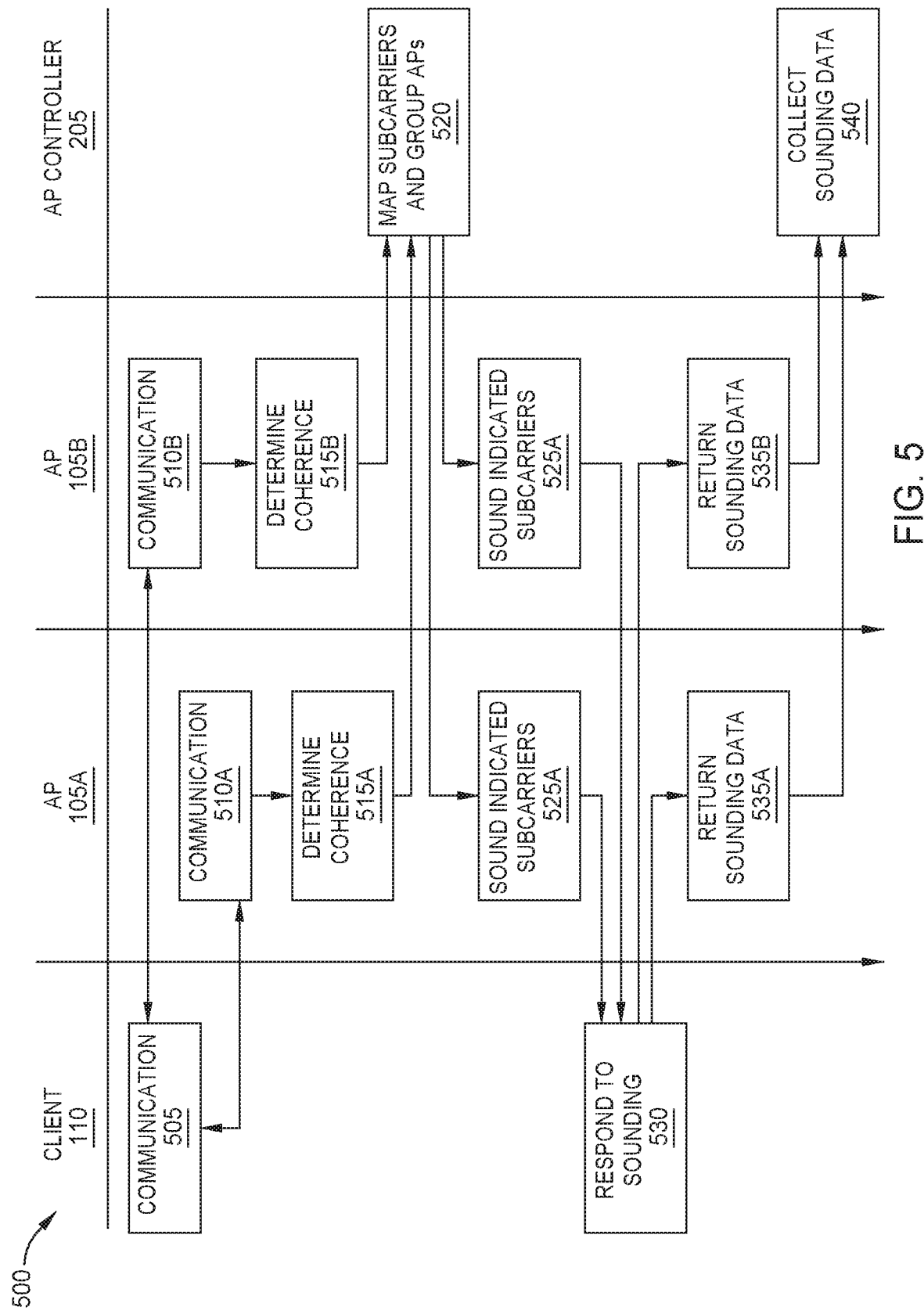
FIG. 5 is a flow diagram illustrating a workflow for efficient collaborative AP sounding, according to one embodiment disclosed herein.

FIG. 5 is a flow diagram illustrating a workflow 500 for efficient collaborative AP sounding, according to one embodiment disclosed herein. The illustrated workflow 500 begins in blocks 505 and 510A-B, where a Client 110 communicates with an AP 105A and an AP 105B. That is, the Client 110 is currently exchanging packets with both APS 105A and 105B (either separately, or as part of a cooperative exchange). Additionally, although illustrated as occurring simultaneously, in some embodiments, the Client 110 may have interacted with each AP independently (e.g., with one AP at a time).

At blocks 515A and 515B, each AP 105A-B evaluates these communications to determine or estimate the current channel coherence between itself and the Client 110. Stated differently, each AP 105A-B performs implicit sounding using the ongoing communications. In another embodiment, the APS 105A and 105B initiate explicit sounding to determine the subcarrier/channel coherence. Once this coherence has been determined, as illustrated, the workflow 500 proceeds to block 520 when the APs 105A-B transmit this coherence to the AP Controller 205. In some embodiments, one or more of the APs can act as the master controller, rather than using a separate component.

At block 520, the AP Controller 205 evaluates the coherence data to generate a mapping indicating subcarriers that can be interchangeably sounded, for a given AP/client pair. That is, the AP Controller 205 maps coherent subcarriers for the pairing of AP 105A and Client 110, as well as for the pairing of AP 105B and Client 110. Although a single Client 110 and two APs 105A-B are included in the depicted embodiment, this mapping can similarly include combinations of any number of APs 105 and Clients 110.

Additionally at block 520, the AP Controller 205 groups the APs 105 based on the mapping, and allocates subcarriers to each group. Each allocated subcarriers will be sounded/probed by the AP(s) to which it is assigned. As illustrated, the AP Controller 205 then transmits the generated groupings and allocations to the APs 105A-B. In one embodiment, the generated groupings indicate, for each Client 110, the AP(s) 105 that are included in the group for joint transmission, as well as the subcarrier(s) that should be sounded from the group to the client. This allows more finely tuned sounding, which reduces the needed overhead and improves system performance.

At blocks 525A and 525B, the APs 105A and 105B perform sounding for their assigned subcarrier(s) to the relevant Clients 110. In one embodiment, each AP 105A-B separately sounds the client. In another embodiment, APs 105 that are grouped together perform a joint sounding. At block 530, upon receiving the sound request(s), the Client 110 responds to the sounding with one or more response frames. The workflow 500 then continues to blocks 535A and 535B, where each AP 105A-B aggregates the sounding data and forwards it to the AP Controller 205. Finally, at block 540, the AP Controller 205 collects, aggregates, and/or stores the sounding data. This information can be used to inform future AP groupings for joint transmissions.

Figure 6:
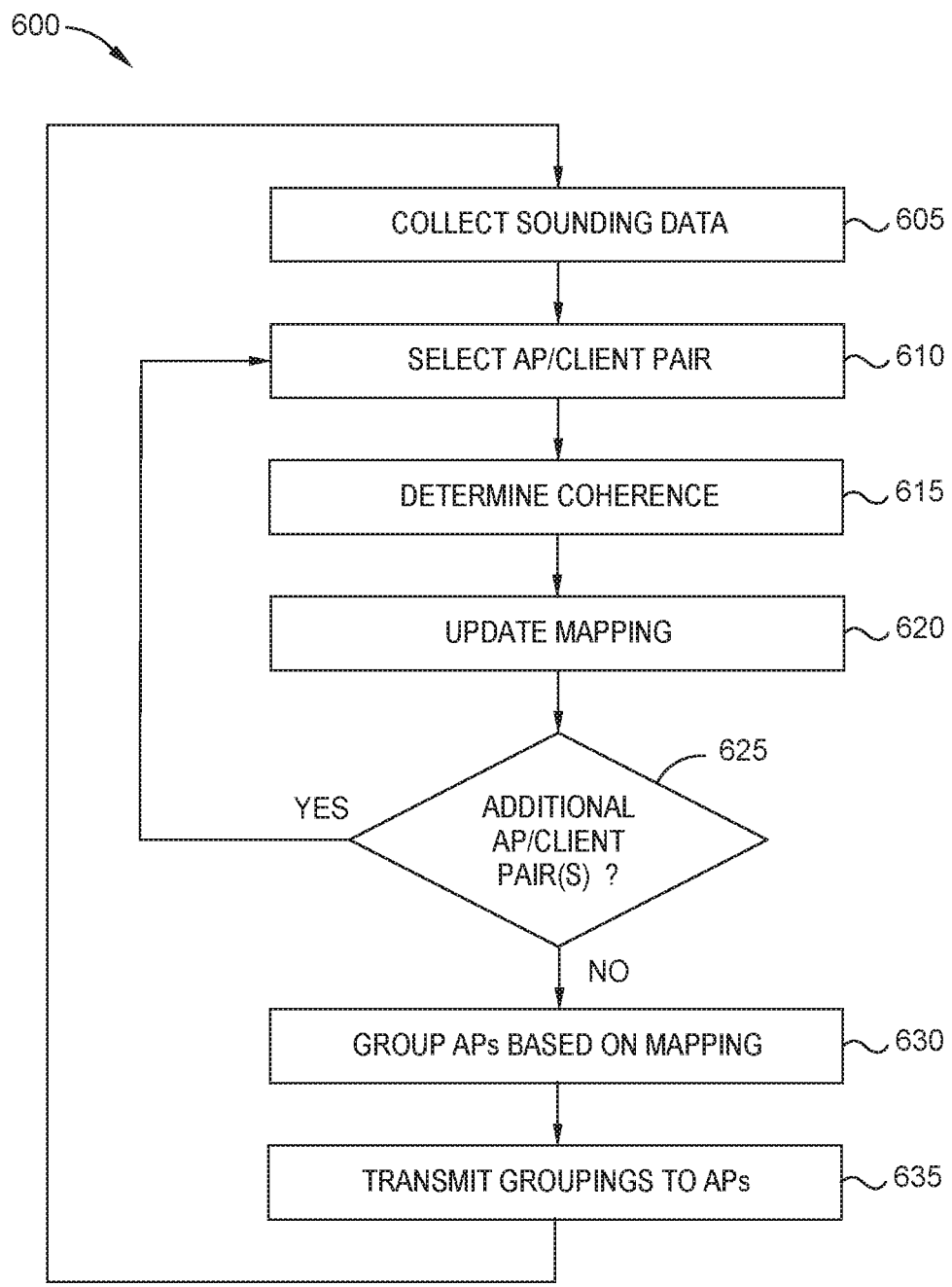
FIG. 6 is a flow diagram illustrating a method for evaluating subcarrier coherence to efficiently sound a network, according to one embodiment disclosed herein.

FIG. 6 is a flow diagram illustrating a method 600 for evaluating subcarrier coherence to efficiently sound a network, according to one embodiment disclosed herein. The method 600 begins at block 605, where a Sounding Application 235 collects sounding data for a network. As discussed above, this can include receiving coherence data from each AP in the deployment. In some embodiments, the coherence data/sounding data is AP/client-specific, such that different values are provided for each AP/client pair. In embodiments, subcarrier coherence is determined based on predefined minimum criteria, such that coherent subcarriers can be interchangeably sounded. That is, two subcarriers are coherent if their characteristics are sufficiently-similar that the characteristics of one can reliably be used as representative of the other.

In one embodiment, the coherence data includes, for each respective subcarrier, an indication of the last coherent subcarrier (or the distance to the last coherent subcarrier) above and/or below the respective subcarrier. In another embodiment, the coherence data indicates only the boundaries between coherency bandwidths. For example, the coherence data may indicate that the boundaries between coherency bandwidths are subcarrier indices four/five, nine/ten, and eighteen/nineteen. The Sounding Application 235 can thereby determine that subcarrier indices zero through four are coherent, subcarriers five through nine are coherent, subcarriers ten through 18 are coherent, and subcarriers 19 through the end of the channel are coherent.

The method 600 then continues to block 610, where the Sounding Application 235 selects one of the AP/client combinations reflected in the sounding data. At block 615, the Sounding Application 235 determines the subcarrier coherence for the selected combination. That is, the Sounding Application 235 identifies subcarriers that can be interchangeably sounded for the selected pair. At block 620, the Sounding Application 235 updates or generates a mapping based on this determined coherency. Stated differently, the Sounding Application 235 updates the mapping to indicate the set of coherent subcarriers for each subcarrier, with respect to the AP/client combination. For example, given the selected AP and client and any respective subcarrier, the mapping indicates other subcarriers that are coherent to the provided subcarrier. The method 600 then continues to block 625.

At block 625, the Sounding Application 235 determines whether there is at least one additional AP/client pair in the received data. If so, the method 600 returns to block 610. In this way, the Sounding Application 235 iteratively evaluates each pair to generate a complete mapping indicating subcarrier coherency. If all available sounding data has been evaluated, the method 600 proceeds to block 630. At block 630, the Sounding Application 235 uses the mapping to generate AP groupings and subcarrier assignments. For example, in one embodiment, the Sounding Application 235 groups the APs such that any APs with narrow coherence bandwidth in similar sections of the spectrum are not grouped together. Similarly, in an embodiment, generating the groups includes grouping APs that can participate in collaborative sounding/transmissions, based on determining that they have wide coherency bandwidths in similar regions. In at least one embodiment, as long as devices do not have overlapping subcarriers that need to be sounded, they can be grouped. In some embodiments, the mapping is therefore used to check for any overlap, and to blacklist groups that have any overlap in subcarriers that require sounding for more than one client.

In one embodiment, the Sounding Application 235 further allocates subcarriers to each group and/or each AP at this time. The allocation indicates the subcarrier(s) that each AP or AP group should sound on. The method 600 then continues to block 635, where the Sounding Application 235 transmits the generated groupings and/or allocations to the APs. The APs can then use these groupings to evaluate the network. In the illustrated embodiment, the method 600 then repeats by looping back to block 605. In this way, the Sounding Application 235 continuously monitors the subcarrier coherency in order to improve the operations of the network.

Figure 7:
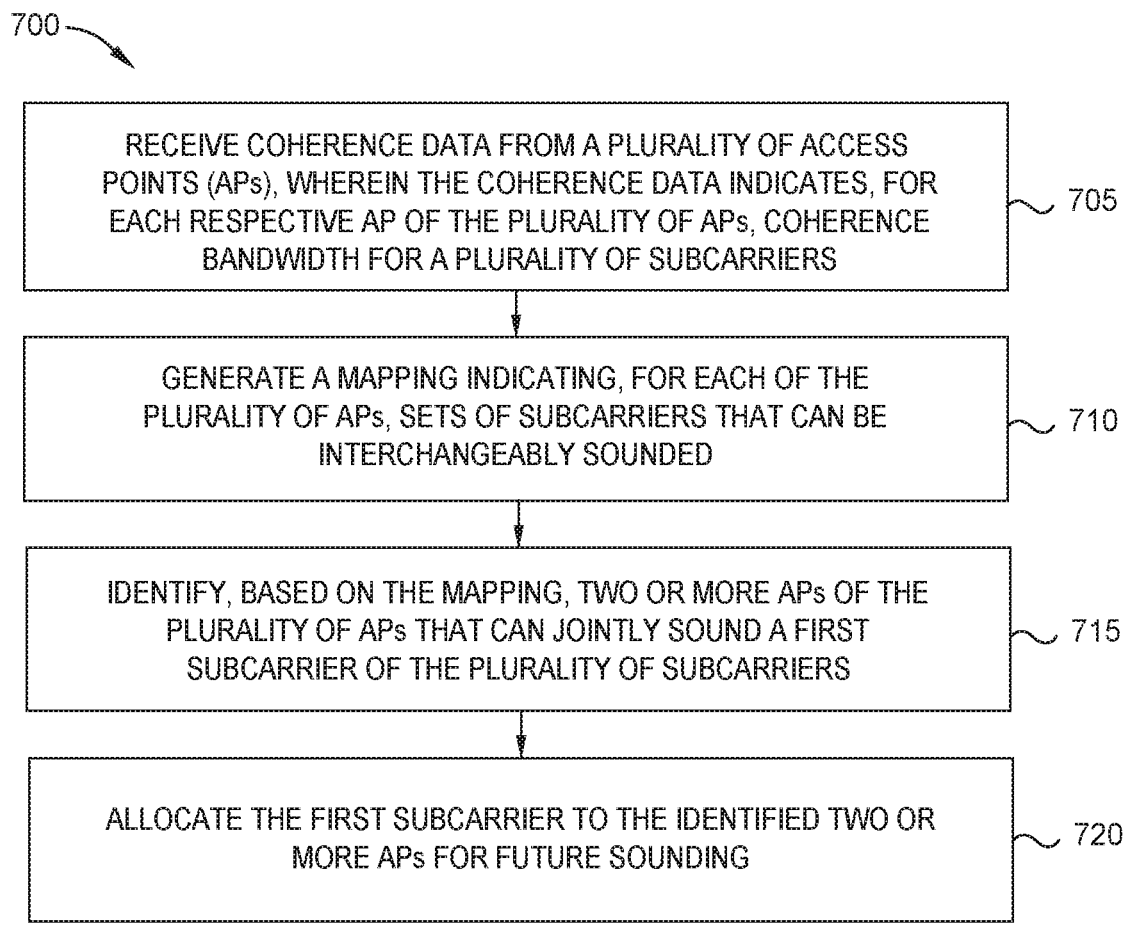
FIG. 7 is a flow diagram illustrating a method for allocating subcarriers for sounding based on coherence bandwidths, according to one embodiment disclosed herein.

FIG. 7 is a flow diagram illustrating a method 700 for allocating subcarriers for sounding based on coherence bandwidths, according to one embodiment disclosed herein. The method 700 begins at block 705, where a Sounding Application 235 receives coherence data from a plurality of access points (APs), wherein the coherence data indicates, for each respective AP of the plurality of APs, coherence bandwidth for a plurality of subcarriers. At block 710, the Sounding Application 235 generates a mapping indicating, for each of the plurality of APs, sets of subcarriers that can be interchangeably sounded. The method 700 then continues to block 715, where the Sounding Application 235 identifies, based on the mapping, two or more APs of the plurality of APs that can jointly sound a first subcarrier of the plurality of subcarriers. Additionally, at block 720, the Sounding Application 235 allocates the first subcarrier to the identified two or more APs for future sounding.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   receiving coherence data from a plurality of access points (APs), wherein the coherence data indicates, for each respective AP of the plurality of APs, coherence bandwidth for a plurality of subcarriers, the coherence bandwidth indicating, for at least a first subcarrier of the plurality of subcarriers, a number of adjacent subcarriers that are correlated with the first subcarrier above a defined threshold;
   generating a mapping indicating, for the plurality of APs, at least a first set of subcarriers that can be interchangeably sounded, wherein the first set of subcarriers includes the first subcarrier, and wherein sounding data for the first subcarrier is representative of sounding data for adjacent subcarriers in the first set of subcarriers;
   identifying, based on the mapping, two or more APs of the plurality of APs that can jointly sound the first subcarrier of the plurality of subcarriers; and
   allocating the first subcarrier to the identified two or more APs for future sounding.

2. The method of claim 1, wherein identifying the two or more APs comprises:
   determining, for each of the two or more APs, that coherence bandwidth for the first subcarrier exceeds a predefined threshold.

3. The method of claim 1, wherein the identified two or more APs includes a first AP and a second AP, and wherein identifying the two or more APs comprises:
   identifying, for the first AP, a first set of subcarriers with a coherence bandwidth below a predefined threshold;
   identifying, for the second AP, a second set of subcarriers with a coherence bandwidth below a predefined threshold; and
   determining that the first and second sets of subcarriers do not overlap.

4. The method of claim 1, wherein allocating the first subcarrier to the identified two or more APs comprises:
   instructing the two or more APs to jointly sound on the first subcarrier for a predefined period of time; and
   upon determining that the predefined period of time has elapsed, requesting updated coherence data from the plurality of APs.

5. The method of claim 1, the method further comprising:
   allocating each of the plurality of subcarriers to one or more APs of the plurality of APs, based on the mapping.

6. The method of claim 1, wherein a second subcarrier of the plurality of subcarriers is allocated to a third AP of the plurality of APs, and wherein, responsive to the allocation, the identified two or more APs:
   sound the first subcarrier; and
   refrain from sounding the second subcarrier.

7. The method of claim 1, the method further comprising:
   determining, for a first AP of the plurality of APs, that coherence bandwidth for the first subcarrier is below a predefined threshold; and
   instructing the first AP to perform additional sounding for the first subcarrier.

8. The method of claim 1, wherein at least a portion of the coherence data was collected by each of the plurality of APs via implicit sounding using packets received from one or more client devices.

9. The method of claim 8, wherein at least a second portion of the coherence data was collected by a first AP of the plurality of APs via explicit sounding upon determining that insufficient uplink packets were available for implicit sounding.

10. A non-transitory computer-readable storage medium containing computer program code that, when executed by operation of one or more computer processors, performs an operation comprising:
  receiving coherence data from a plurality of access points (APs), wherein the coherence data indicates, for each respective AP of the plurality of APs, coherence bandwidth for a plurality of subcarriers, the coherence bandwidth indicating, for at least a first subcarrier of the plurality of subcarriers, a number of adjacent subcarriers that are correlated with the first subcarrier above a defined threshold;
  generating a mapping indicating, for the plurality of APs, at least a first set of subcarriers that can be interchangeably sounded, wherein the first set of subcarriers includes the first subcarrier, and wherein sounding data for the first subcarrier is representative of sounding data for adjacent subcarriers in the first set of subcarriers;
  identifying, based on the mapping, two or more APs of the plurality of APs that can jointly sound the first subcarrier of the plurality of subcarriers; and
  allocating the first subcarrier to the identified two or more APs for future sounding.

11. The computer-readable storage medium of claim 10, wherein the identified two or more APs includes a first AP and a second AP, and wherein identifying the two or more APs comprises:
  identifying, for the first AP, a first set of subcarriers with a coherence bandwidth below a predefined threshold;
  identifying, for the second AP, a second set of subcarriers with a coherence bandwidth below a predefined threshold; and
  determining that the first and second sets of subcarriers do not overlap.

12. The computer-readable storage medium of claim 10, wherein allocating the first subcarrier to the identified two or more APs comprises:
  instructing the two or more APs to jointly sound on the first subcarrier for a predefined period of time; and
  upon determining that the predefined period of time has elapsed, requesting updated coherence data from the plurality of APs.

13. The computer-readable storage medium of claim 10, wherein a second subcarrier of the plurality of subcarriers is allocated to a third AP of the plurality of APs, and wherein, responsive to the allocation, the identified two or more APs:
  sound the first subcarrier; and
  refrain from sounding the second subcarrier.

14. The computer-readable storage medium of claim 10, wherein at least a portion of the coherence data was collected by each of the plurality of APs via implicit sounding using packets received from one or more client devices.

15. The computer-readable storage medium of claim 14, wherein at least a second portion of the coherence data was collected by a first AP of the plurality of APs via explicit sounding upon determining that insufficient uplink packets were available for implicit sounding.

16. A system comprising:
  one or more computer processors; and
  a memory containing a program which when executed by the one or more computer processors performs an operation, the operation comprising:
    receiving coherence data from a plurality of access points (APs), wherein the coherence data indicates, for each respective AP of the plurality of APs, coherence bandwidth for a plurality of subcarriers, the coherence bandwidth indicating, for at least a first subcarrier of the plurality of subcarriers, a number of adjacent subcarriers that are correlated with the first subcarrier above a defined threshold;
    generating a mapping indicating, for the plurality of APs, at least a first set of subcarriers that can be interchangeably sounded, wherein the first set of subcarriers includes the first subcarrier, and wherein sounding data for the first subcarrier is representative of sounding data for adjacent subcarriers in the first set of subcarriers;
    identifying, based on the mapping, two or more APs of the plurality of APs that can jointly sound the first subcarrier of the plurality of subcarriers; and
    allocating the first subcarrier to the identified two or more APs for future sounding.

17. The system of claim 16, wherein the identified two or more APs includes a first AP and a second AP, and wherein identifying the two or more APs comprises:
  identifying, for the first AP, a first set of subcarriers with a coherence bandwidth below a predefined threshold;
  identifying, for the second AP, a second set of subcarriers with a coherence bandwidth below a predefined threshold; and
  determining that the first and second sets of subcarriers do not overlap.

18. The system of claim 16, wherein allocating the first subcarrier to the identified two or more APs comprises:
  instructing the two or more APs to jointly sound on the first subcarrier for a predefined period of time; and
  upon determining that the predefined period of time has elapsed, requesting updated coherence data from the plurality of APs.

19. The system of claim 16, wherein a second subcarrier of the plurality of subcarriers is allocated to a third AP of the plurality of APs, and wherein, responsive to the allocation, the identified two or more APs:
  sound the first subcarrier; and
  refrain from sounding the second subcarrier.

20. The system of claim 16, wherein at least a portion of the coherence data was collected by each of the plurality of APs via implicit sounding using packets received from one or more client devices, and wherein at least a second portion of the coherence data was collected by a first AP of the plurality of APs via explicit sounding upon determining that insufficient uplink packets were available for implicit sounding.

* * * * *

UNITED STATES PATENT AND TRADEMARK OFFICE
CERTIFICATE OF CORRECTION

| | |
|---|---|
| PATENT NO. | : 11,412,502 B2 |
| APPLICATION NO. | : 16/810671 |
| DATED | : August 9, 2022 |
| INVENTOR(S) | : Pooya Monajemi et al. |

It is certified that error appears in the above-identified patent and that said Letters Patent is hereby corrected as shown below:

In the Specification

In Column 4, Line 54, delete "(H[k1]H×H[k2])))" and insert -- (H[k1]$^H$×H[k2])) --.

In Column 6, Line 47, after "may" insert -- be --.

In Column 12, Line 60, delete "computer readable" and insert -- computer-readable --.

In Column 12, Line 60, delete "computer readable" and insert -- computer-readable --.

In Column 12, Line 62, delete "computer readable" and insert -- computer-readable --.

In Column 13, Line 34, delete "computer readable" and insert -- computer-readable --.

In Column 13, Line 37, delete "computer readable" and insert -- computer-readable --.

Signed and Sealed this
First Day of November, 2022

Katherine Kelly Vidal
*Director of the United States Patent and Trademark Office*